(12) United States Patent
Shinohara et al.

(10) Patent No.: US 10,191,235 B2
(45) Date of Patent: Jan. 29, 2019

(54) LENS MEMBER, METHOD OF MANUFACTURING THE SAME, COMMUNICATION MODULE, LENS ARRAY, AND LIGHT-SOURCE MODULE

(71) Applicant: MAXELL, LTD., Otokuni-gun, Kyoto (JP)

(72) Inventors: Hideki Shinohara, Ibaraki (JP); Koichi Ozaki, Ibaraki (JP); Mitsunobu Suzuishi, Ibaraki (JP)

(73) Assignee: MAXELL, LTD., Otokuni (JP)

( * ) Notice: Subject to any disclaimer, the term of this patent is extended or adjusted under 35 U.S.C. 154(b) by 0 days.

(21) Appl. No.: 15/720,798

(22) Filed: Sep. 29, 2017

(65) Prior Publication Data

US 2018/0067272 A1 Mar. 8, 2018

Related U.S. Application Data

(63) Continuation of application No. 15/104,050, filed as application No. PCT/JP2014/083061 on Dec. 12, 2014, now Pat. No. 9,810,865.

(30) Foreign Application Priority Data

Dec. 12, 2013 (JP) .................................. 2013-257233

(51) Int. Cl.
*G02B 6/42* (2006.01)
*G02B 7/02* (2006.01)
(Continued)

(52) U.S. Cl.
CPC .......... *G02B 6/4244* (2013.01); *G02B 3/0056* (2013.01); *G02B 6/425* (2013.01); *G02B 7/021* (2013.01); *B29C 45/14065* (2013.01); *B29C 45/14434* (2013.01); *B29C 45/33* (2013.01); *B29K 2709/08* (2013.01); *B29L 2011/00* (2013.01); *B29L 2011/0016* (2013.01); *C03C 27/00* (2013.01); *G02B 3/0031* (2013.01); *G02B 6/32* (2013.01)

(58) Field of Classification Search
None
See application file for complete search history.

(56) References Cited

U.S. PATENT DOCUMENTS 6,432,733 B1    8/2002  Hashizume
2012/0293878 A1  11/2012 Mori et al.

FOREIGN PATENT DOCUMENTS

JP    H05-273447 A    10/1993
JP    H11-54849 A     2/1999
(Continued)

OTHER PUBLICATIONS

Mar. 24, 2015 International Search Report issued in International Patent Application No. PCT/JP2014/083061.
(Continued)

*Primary Examiner* — Jerry Rahll
(74) *Attorney, Agent, or Firm* — Oliff PLC

(57) ABSTRACT

There are provided a lens member, a method of manufacturing the lens member, a communication module, a lens array, and a light-source module, the lens member including a ready-made glass lens added with a mounting portion having a reference face as a plane for reference when the glass lens is mounted on a substrate. A lens member includes a glass ball lens to which sphericity processing has been previously performed, and a resin mounting portion disposed on the glass ball lens. The mounting portion is molded by flowing the resin in a flowable state into a die including the glass ball lens disposed therein. The mounting portion includes a reference face that abuts on a mounting face in a case where the glass ball lens is surface-mounted, provided thereto.

11 Claims, 12 Drawing Sheets

(51) Int. Cl.
    *G02B 3/00* (2006.01)
    *B29L 11/00* (2006.01)
    *B29C 45/14* (2006.01)
    *B29C 45/33* (2006.01)
    *C03C 27/00* (2006.01)
    *B29K 709/08* (2006.01)
    *G02B 6/32* (2006.01)

(56) References Cited

FOREIGN PATENT DOCUMENTS

| | | |
|---|---|---|
| JP | 2001-74914 A | 3/2001 |
| JP | 2003-270497 A | 9/2003 |
| JP | 2004-103170 A | 4/2004 |
| JP | 2004-239970 A | 8/2004 |
| JP | 2005-70568 A | 3/2005 |
| JP | 2008-150265 A | 7/2008 |
| JP | 2011-131511 A | 7/2011 |
| JP | 2013-80900 A | 5/2013 |
| WO | 2011/089815 A1 | 7/2011 |

OTHER PUBLICATIONS

Mar. 24, 2015 Written Opinion issued in International Patent Application No. PCT/JP2014/083061.
Aug. 22, 2017 Office Action issued in Japanese Patent Application No. 2015-552553.

[Fig. 7A]
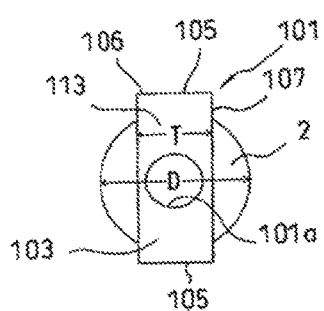
[Fig. 7B]
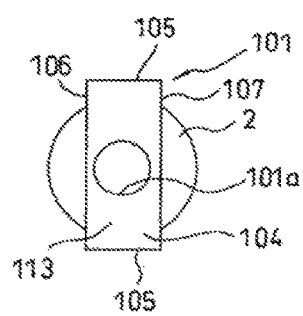
[Fig. 7C]
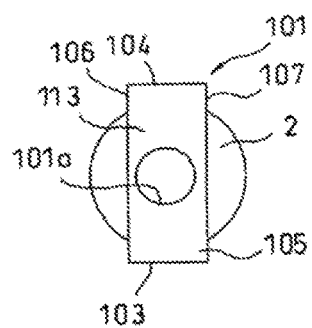
[Fig. 7D]
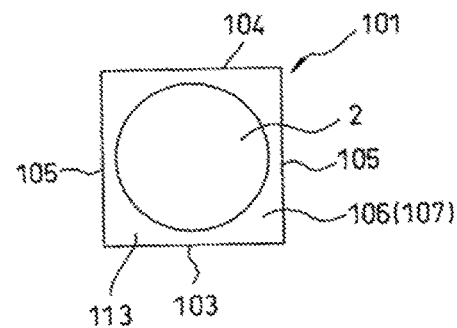
[Fig. 8]
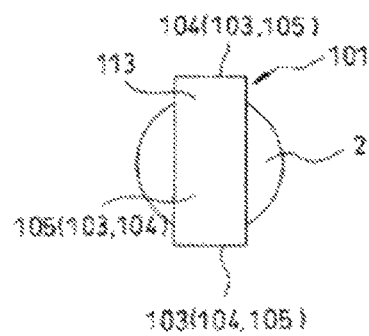

[Fig. 18]
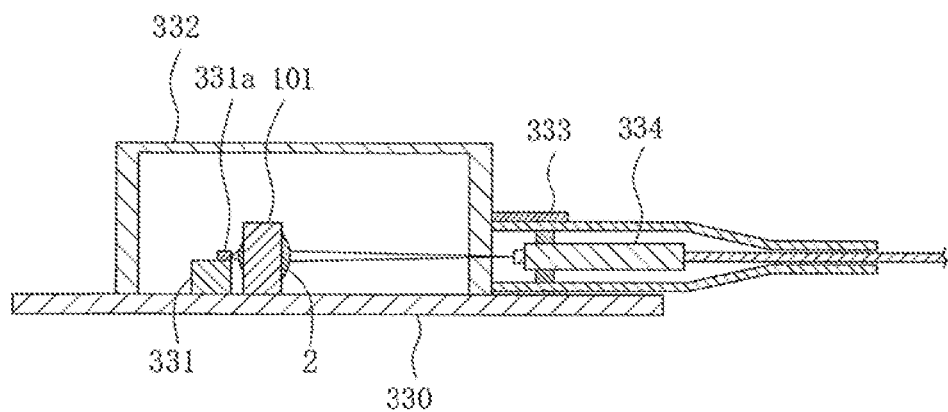
[Fig. 19A]
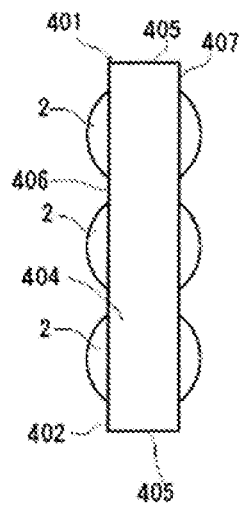
[Fig. 19B]
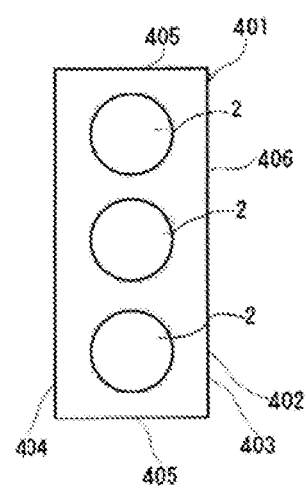
[Fig. 20]
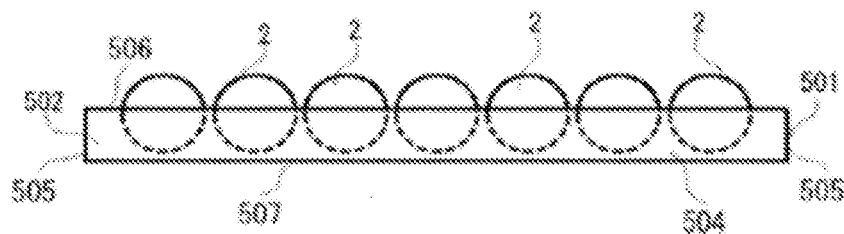

LENS MEMBER, METHOD OF MANUFACTURING THE SAME, COMMUNICATION MODULE, LENS ARRAY, AND LIGHT-SOURCE MODULE

The present application is a continuation of application Ser. No. 15/104,050 filed Jun. 13, 2016, which in turn is a U.S. national stage entry of PCT/JP2014/083061 filed Dec. 12, 2014. Each of these prior applications is incorporated herein by reference in its entirety.

TECHNICAL FIELD

The present invention relates to a lens member, a method of manufacturing the lens member, a communication module, a lens array, and a light-source module.

BACKGROUND ART

It has been known that, for example, a lens for optical communication is surface-mounted on a substrate (for example, a silicon bench) including a laser diode and an end portion of an optical fiber mounted thereon, and focuses light output from the laser diode on the optical fiber.

A glass lens is used for this type of lens instead of using a typical resin lens (refer to Patent Literature 1).

A square lens having a circumferential shape of the glass lens squared, is used in Patent Literature 1. A plane (a reference face) is preferably provided at the circumference of the lens for surface-mounting the lens on a substrate (for example, a silicon bench). That is, the plane at the circumference of the lens is disposed so as to abut on a mounting face of the substrate (a plane on the substrate) on which the lens is mounted. Thus, the lens can be stably disposed on the mounting face of the substrate. In addition, in a case where arrangement relationship between an optical axis of the lens and the plane has been determined and the plane is the reference face, only abutting the reference face against the mounting face, determines, for example, a distance of the optical axis from the substrate. Therefore, the square lens can easily adhere to and fix to the mounting face of the substrate, using for example, an ultraviolet curable resin.

Providing a reference face to an aspheric lens that has been previously molded, by post-processing, such as dicing and polishing, is also performed except the above square lens.

In a case where a ball lens formed by polishing is used, it has been known a method of sealing the ball lens in a body tube provided by cutting a stainless steel material or a can formed by pressing a nickel alloy, with low-melting-point glass. In this case, the ball lens is mounted on the substrate through the body tube or the can.

CITATION LIST

Patent Literature

Patent Literature 1: JP 2008-150265 A

SUMMARY OF INVENTION

Technical Problem

A cost reduction and downsizing both are required for the above device for optical communication. A case where a glass square lens is manufactured by molding, including formation of a reference face, has an advantage in terms of cost in comparison to a case where a glass lens requiring polishing is manufactured. However, a further cost reduction is required.

Here, some glass materials for a glass ball lens have a high melting point. It is difficult to form a glass lens by only molding, depending on the glass materials. Thus, polishing for forming the glass lens is sometimes required. When being present, a reference face becomes obstructive to polishing a glass ball lens requiring this polishing, to be perfectly spherical. Thus, it is difficult to provide the reference face when molding is performed like the above square lens. As a result, a reference face is provided to a glass lens that has been polished and manufactured, by the above post-processing, such as dicing and polishing. Therefore, it is difficult to achieve a cost reduction. Currently, in a market, there is no product in which a glass ball to which sphericity processing has been performed instead of molding is intended to be surface-mounted on a substrate as a glass ball lens that is an optical component. For a provisional appraisal purpose, there is a product in which an AR coating film is deposited on an entire glass ball.

When downsizing is performed to the glass ball lens using the above body tube or can, the body tube and the can become obstructive to the downsizing. Thus, it is difficult to achieve miniaturization. Currently, a product for which it is difficult to use a lens member including a glass ball lens attached to the body tube or the can due to a problem on size, has been miniaturized.

In this case, instead of using the body tube or the can, it is possible to directly surface-mount a perfectly spherical lens (a ball lens) on a substrate by providing a sectionally V-shaped V groove on the substrate. However, when being a completely rotation object like the ball lens, a state where optical directivity is unstable until the ball lens has been placed and fixed on the substrate, occurs. Thus, it is difficult to use the ball lens flexibly.

For example, in a case where AR coating is performed to a surface of a ball lens as described above, a face on which light is incident and a face from which the light is emitted are not determined until the ball lens is mounted on the substrate. Thus, it is necessary to perform the AR coating to the entire ball lens. In this case, when the ball lens is dealt with in order to mount the ball lens on the substrate, the lens ball cannot be dealt with, with the AR coating performed to the entire face avoided. Thus, there is a risk that the AR coating is damaged. In this case, when the damage of the AR coating is disposed at the portion of the ball lens on which the light is incident or from which the light is emitted, there is a risk that a yield degrades and optical characteristics degrade. Note that, for example, in a case where the above glass square lens, body tube, and can, are used, a face requiring AR coating is obvious. Thus, even when the AR coating is performed to the glass lens before the glass lens is surface-mounted, the lens can be dealt with, with the portion avoided.

That is, using the ball lens that has not been sealed in the body tube or the can, as a single body, is not practical from a point of view of, for example, handling at the time of mounting, addressing to automatic mounting, and handling at the time of adhering to the substrate.

The present invention has been made in consideration of the above problems. The present invention is to provide a lens member, a method of manufacturing the lens member, a communication module, a lens array, and a light-source module, the lens member including a ready-made glass lens added with a mounting portion (a molded body) to which the glass lens is attached.

Solution to Problem

In order to achieve the above object, a lens member according to the present invention, includes a glass lens that has been previously made; and amounting portion, on the glass lens, including a material different from the glass lens, and provided by flowing the material in a flowable state into a mold in which the glass lens is disposed and fixing the material. The mounting portion includes a reference face that abuts on amounting face in a case where the glass lens is surface-mounted, provided thereto.

With this configuration, even when the glass lens is, for example, a spherical lens or an aspheric lens, the glass lens is basically manufactured as a glass lens by molding and polishing (including sphericity processing). Thus, the lens designed and manufactured at a cost as low as possible, can be used as a glass lens single body without post-processing, such as dicing or polishing.

It is thought that the mounting portion is manufactured, for example, by resin injection molding in a state where the above glass lens has been fixed in a die (a mold) or by flowing a material having fluidity before solation or after the solation into the mold and manufacturing the material as glass or ceramics by a sol-gel method in a state where the above glass lens has been fixed in the mold. In these cases, the mounting portions each include the material different from the glass lens. The mounting portion is provided so as to cover the glass lens with a degree of not coming off the glass lens in a state a portion on which light is incident and a portion from which the light is emitted are exposed, when the lens member is used. For example, a plane reference face is provided at a column short in an axial direction in a state where a portion of the glass lens is included inside, and is provided at an outer circumferential face of the substantially columnar mounting portion.

In the sol-gel method, the material, for example, in a solution state or in a sol state where the material has solated from solution, may be poured into the mold. After that, in a case where the material is in the solution state, the material may be solated and then may be gelated. In a case where the material is in the sol state, the material may be gelated. Then, the material may be further dried by heating with a relatively low temperature (for example, 100 degree Celsius or less). In this case, for example, a mounting portion having a reference face can be also integrally provided with a glass lens at a low cost with glass or ceramics manufactured by the sol-gel method.

In the above configuration according to the present invention, the glass lens is preferably circular when viewed in an optical axis direction.

With this configuration, for example, in a case where the mounting portion is manufactured by press molding, the glass lens disposed in a cavity of the die is pressurized and molded in the cavity. Thus, when the lens has rotational symmetric and an outer form is circular, molding accuracy can be improved. Examples of the glass lens that can be used include a spherical glass lens (a ball lens) to be described later and an aspheric lens. The shape of the spherical lens (an outer form) is circular when viewed in an optical axis direction even in a case where an optical axis is set anywhere. An outer form of the aspheric lens is not necessarily circular when viewed in an optical axis direction. The outer form is preferably made to be circular.

In the above configuration according to the present invention, the glass lens is preferably a glass ball lens including a glass ball to which sphericity processing has been performed.

With this configuration, reduction of a manufacturing cost of the glass ball lens can be achieved. That is, depending on circularity, for example, in a case where the glass ball lens is manufactured by typical sphericity processing for making a ball for a bearing, a cost reduction of the glass ball lens can be achieved. That is, even when the sphericity processing is basically polishing process, a large number of glass balls can be manufactured at once. Reduction of the manufacturing cost of the lens member can be achieved in comparison to a case where an aspheric lens that has been molded is used as a glass lens.

In the above configuration according to the present invention, the mounting portion is preferably formed so as to have a polygonal column in shape including a portion of the glass lens. A hole passing from at least one plane out of three planes or more included in an outer circumferential face, having a polygon in section, of the mounting portion, to a surface of the glass lens is preferably formed at a portion at which a thickness of the mounting portion becomes thin as the at least one plane and the surface of the glass lens come close to each other.

With this configuration, for example, in a case where the mounting portion is a hollow quadrangular prism member having a square in section, as the length of each side of the square in section comes close to the diameter of the glass lens, the surface of the glass lens comes close to respective planes to be four outer circumferential faces at the circumference of the mounting portion. As a result, portions at which the thickness of the mounting portion becomes thin, occur. When the thickness of each of the portions becomes excessively thin, strength degrades. For example, there is a risk that each of the portions at which the thickness has been thin is rent and broken and the mounting portion is detached from the glass lens.

Therefore, the hole is provided at each of the portions at which thickness has been thin so that a configuration including no portions at which the thickness becomes thin is made. Thus, the mounting portion can be prevented from being broken at the portions at which the thickness becomes thin. Note that, the hole is preferably provided when the mounting portion is made instead of post-processing. For example, a protruding portion reaching the surface of the glass lens, is provided on an inner face of the mold corresponding to each of the above planes. When the protruding portion is removed, a structure in which the hole is provided, is preferably made.

As the reference face, at least one of the above outer circumferential planes of the mounting portion is a portion to be fixed to the mounting face of the substrate with, for example, an adhesive, when the lens member is surface-mounted on the substrate. When a portion that is weak with a thin thickness is present on the reference face, there is a risk that the portion is broken when the portion adheres to the substrate, resulting in a cause of detaching the lens member from the substrate. Therefore, providing the structure without the portion at an initial stage can inhibit the lens member from coming off the substrate. In a case where an ultraviolet curable resin is used for adherence, filling the ultraviolet curable resin into the hole can strengthen the adherence with an increase of a resin amount. In this case, the ultraviolet curable resin filled in the hole is made so as to be in contact with both of the mounting face of the substrate and the surface of the glass lens. Thus, a structure in which the substrate and the glass lens directly adhere to each other, is made. As a result, the adherence can be further strengthened.

In the above configuration according the present invention, a hole passing from the reference face of the mounting portion to the surface of the glass lens is preferably formed at a portion at which the thickness of the mounting portion becomes thin as the reference face and the surface of the glass lens come close to each other.

With this configuration, the mounting portion can be prevented from being broken at the reference face fixed to the mounting face of the substrate, and the lens member can be prevented from coming off the substrate, as described above, as in a case where the plane on which the hole is formed is the reference face. Pouring an adhesive into the hole and increasing an adhesive amount to be used can strengthen adherence. In addition, the glass lens and the substrate directly adhere to each other with the adhesive in the hole. Note that in a case where the adhesive is an ultraviolet curable resin, for example, the following structure is preferable. A hole passing to the glass ball, is also provided on a face of the mounting portion facing through the glass lens. The ultraviolet curable resin in the hole of the reference face is irradiated with ultraviolet rays through the glass lens.

In the above configuration according to the present invention, a shortest distance between an outer face of the glass lens disposed in the mounting portion and an outer face of the mounting portion is preferably 0.1 mm or more.

With this configuration, a portion at which the thickness of the mounting portion (a shortest distance between the outer face of the glass lens and the outer face of the mounting portion) is thinnest, is made to be 0.1 mm or more in thickness. Thus, sufficient strength can be acquired. Note that, as described above, a hole may be provided at the portion at which the thickness between the mounting portion and the glass lens becomes thin. Thus, the portion with a thickness of 0.1 mm or less may be eliminated.

In the above configuration according to the present invention, in a case where the mounting portion is formed so as to have a rectangular parallelepiped in shape and includes a pair of outer faces, parallel to each other, disposed so as to be perpendicular to an optical axis of the glass lens, a thickness of the glass lens in an optical axis direction is defined as D, and a distance of the mounting portion between the pair of outer faces perpendicular to the optical axis of the glass lens, in the optical axis direction is defined as T, a value of T is preferably a value of D or more.

With this configuration, a structure in which the mounting portion substantially covers the glass lens, can be made. For example, the mounting portion can effectively inhibit unnecessary external light from being incident. Thus, the structure is effective for preventing stray light. Note that an incident face and an emission face of light of the glass lens are preferably exposed by providing holes to the mounting portion as described above. Note that, in a case where the glass lens is spherical, the optical axis direction of the glass lens is determined in a state where the mounting portion has supported the glass lens. Here, a direction perpendicular to the above pair of outer faces is the optical axis direction of the spherical glass lens.

In the above configuration according to the present invention, in a case where the mounting portion is formed so as to have a rectangular parallelepiped in shape and includes a pair of outer faces, parallel to each other, disposed so as to be perpendicular to an optical axis of the glass lens, a thickness of the glass lens in an optical axis direction is defined as D, and a distance of the mounting portion between the pair of outer faces perpendicular to the optical axis of the glass lens, in the optical axis direction is defined as T, the following expression is preferably satisfied: $0.2D \leq T \leq 2.0D$.

With this configuration, the distance T between the pair of outer faces of the mounting portion perpendicular to the optical axis is made so as to be 0.2 times or more the thickness D of the glass lens in the optical axis direction. Thus, the lens member can be stably disposed on the substrate. For example, in a case where the lens member is mounted on the substrate, a structure in which the lens member barely falls down before adhering to the substrate, can be made. The distance T is made to be two times or less the thickness D. Thus, a structure that is easily handled, can be made. When the mounting portion is excessively long in the optical direction, for example, in a case where the lens member is used for a communication module to be described later, the mounting portion becomes adjacent to a semiconductor laser as a light-emitting element, or becomes adjacent to an end face of an optical communication cable. Thus, there is a possibility that workability degrades.

A method of manufacturing a lens member to be used for manufacturing the lens members according to the present invention, includes providing a mounting portion including a reference face that abuts on a mounting face when the glass lens is surface-mounted, by flowing a material, different from the glass lens and having fluidity, into a mold in which the glass lens previously made is disposed and fixing the material.

With this configuration, the lens members having the above functional effects can be manufactured.

A lens member of the present invention includes: a glass lens; and a molded body (a mounting portion) molded in a state where at least a portion of the glass lens has been housed inside, and supporting the glass lens. An incident face on which light of the glass lens is incident, and an emission face from which the light of the glass lens is emitted, are exposed from the molded body.

With this configuration, the glass lens is supported by the molded body. Thus, there is no need for performing processing for placement of the glass lens to the glass lens. The molded body for supporting the glass is molded. The glass lens can be easily placed at a placement position through the molded body.

A lens member of the present invention includes: a glass lens; and a molded body molded in a state where at least a portion of the glass lens has been housed inside, and supporting the glass lens. The molded body includes an attaching face that attaches the molded body to another member, provided thereto. An incident face on which light of the glass lens is incident, and an emission face from which the light of the glass lens is emitted, are exposed from the molded body.

With this configuration, the glass lens is supported by the molded body. Thus, there is no need for performing processing for placement of the glass lens to the glass lens. The molded body having the attaching face for attaching the glass lens to another member is molded, supporting the glass lens. The glass lens can be easily attached to another member through the molded body. The size of the molded body can be made to be substantially the same as the diameter of the glass lens. The molded body can contribute to miniaturization of a device that uses the lens member.

In the above configuration according to the present invention, a portion of the glass lens preferably protrudes from the attaching face of the molded body so as to be inserted into a recess portion or a through hole provided on a face to be attached of another member to which the molded body is attached.

With this configuration, a distance between the face to be attached of another member and an optical axis of the glass lens can be made shorter than the radius of the glass lens. In a case where the glass lens is attached to another member on the attaching face through the molded body, a distance between the face to be attached and the optical axis of the glass lens becomes longer than the radius of the glass lens. However, a state that the portion of the glass lens protruding from the attaching face has been inserted into the recess portion or the through hole of the face to be attached, is made. Thus, the distance between the face to be attached and the optical axis can be made shorter than the radius of the glass lens. As a result, a device including the lens member can be miniaturized.

A lens member according to the present invention includes: a glass lens; and a molded body molded in a state where at least a portion of the glass lens has been housed inside, and supporting the glass lens. The molded body includes an attaching face that attaches the molded body to another member, provided thereto. The molded body is provided so as to have a rectangular parallelepiped in shape, and the glass lens is provided so as to have a sphere in shape. An outer face of the glass lens is disposed inside at least two outer faces, parallel to each other, out of six outer faces of the molded body.

With this configuration, a state where the spherical glass lens has been supported by the rectangular-parallelepiped-shaped molded body, is made. The outer face of the glass lens is disposed inside the at least two outer faces, parallel to each other, out of the six outer faces of the molded body. In this case, for example, the outer face of the glass lens may be disposed so as to be outside two outer faces, parallel to each other, out of the remaining outer faces, except the two faces inside which the outer face of the glass lens is disposed, out of the six faces. That is, a state where the glass lens protrudes from each of the pair of outer faces, parallel to each other, may be made. In this case, the two portions of the glass lens protruding from the molded body, can be made to be an incident face and an emission face of light. In this case, a distance between the two outer faces from which the glass lens is exposed, becomes shorter than the diameter of the glass lens. Thus, the lens member can be further miniaturized.

In the above configuration according to the present invention, at least two portions of the outer face of the glass lens are preferably exposed from the molded body by disposing the outer face of the glass lens inside the six outer faces of the molded body, and providing a hole passing to the outer face of the glass lens, on at least two faces, parallel to each other, out of the faces of the molded body, with the length of each side, the direction of which is mutually different, of the molded body made longer than the diameter of the glass lens.

With this configuration, even when the glass lens is disposed inside the six outer faces of the molded body, the portions to be an incident face and an emission face of the glass lens can be exposed from the molded body. A corner portion of the molded body can secure a degree of distance from the outer face of the glass lens. Thus, the strength of the molded body can be improved.

A communication module according to the present invention, includes: any of the above lens members; a light-emitting element; and a substrate including any of the lens members and the light-emitting element mounted thereon. Light of the light-emitting element is incident on an optical communication cable through the lens member.

With this configuration, the light of the light-emitting element can be focused on an end face of the optical communication cable and can be incident on the optical communication cable by using any of the above lens members. The lens members can contribute to miniaturization, improvement of assemblability, and a cost reduction of an optical communication module.

Note that the light-emitting element is, for example, a light-emitting diode or a semiconductor laser. The optical communication cable includes, for example, an optical fiber.

A lens array according to the present invention includes: a plurality of spherical glass lenses; and a molded body molded in a state where the plurality of glass lenses has been arranged in a predetermined arrangement and in a state where at least a portion of each of the glass lenses has been housed inside, and supporting the plurality of glass lenses.

With this configuration, the lens array basically includes the plurality of glass lenses supported by the molded body, and can acquire a functional effect similar to that in a case where one glass lens is supported by the molded body. Note that, for example, when a transparent resin is used as the molded body, incidence of light on each of the glass lenses or emission of light from each of the glass lenses may be made through the molded body. For example, a structure in which a portion of each of the glass lenses is exposed from the molded body, may be made. For example, the lens array can be made to have substantially the same shape and substantially the same function as a lens array in which convex faces are arranged on a plate-like glass. A cost reduction can be achieved for this type of lens array. That is, the lens array in which the plurality of glass lenses is supported by the molded body can be manufactured at a low cost in comparison to a case where a plate-like lens array is molded with glass and is polished.

A light-source module according to the present invention includes: the above lens array; and a plurality of light-emitting elements configured to irradiate light through the lens array.

With this configuration, for example, a light-source device including light-emitting elements are attached to, for example, a molded body of a lens array including glass lenses arranged in rows and columns. Thus, light of the light-emitting elements can be emitted through the lens array. In this case, a cost reduction can be also achieved in comparison to the lens array including convex faces arranged on the plate-like glass, for example, as described above.

Advantageous Effects of Invention

According to the present invention, for a lens member having a reference face that abuts on a mounting face when surface-mounted on a substrate, a ready-made glass lens is disposed in a mold and also a material, different from the glass lens, is fixed in the mold. Thus, the mounting portion (a molded body) having the reference face (an attaching face) can be provided so as to be fixed to the glass lens. A cost reduction and miniaturization of a glass member having the reference face, can be achieved.

BRIEF DESCRIPTION OF DRAWINGS

FIGS. 7A to 7D are views of a lens member according to a second embodiment of the present invention. FIG. 7A is a bottom view. FIG. 7B is a plan view. FIG. 7C is a side view.

FIG. 7D is a front view (rear view).

FIG. 8 is a side view in a modification in which a hole 1a of the lens member is not formed according to the second embodiment of the present invention.

FIG. 18 is a schematic view of a communication module according to an eighth embodiment of the present invention.

FIGS. 19A and 19B are views of a lens array according to a ninth embodiment of the present invention. FIG. 19A is a side view, and FIG. 19B is a front view (a rear view).

FIG. 20 is a schematic view of a lens array in a modification according to the ninth embodiment of the present invention.

DESCRIPTION OF EMBODIMENTS

Embodiments of the present invention will be described below with reference to the drawings.

First, a first embodiment of the present invention will be described.

Figure 1:
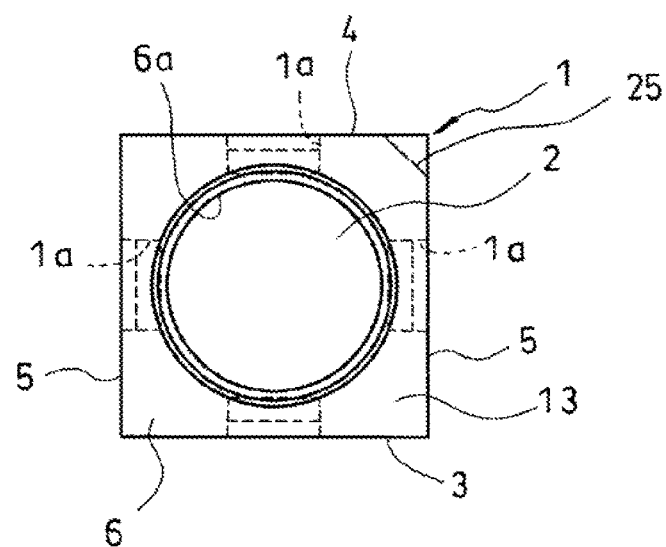
FIG. 1 is a front view of a lens member according to a first embodiment of the present invention.
Figure 2:
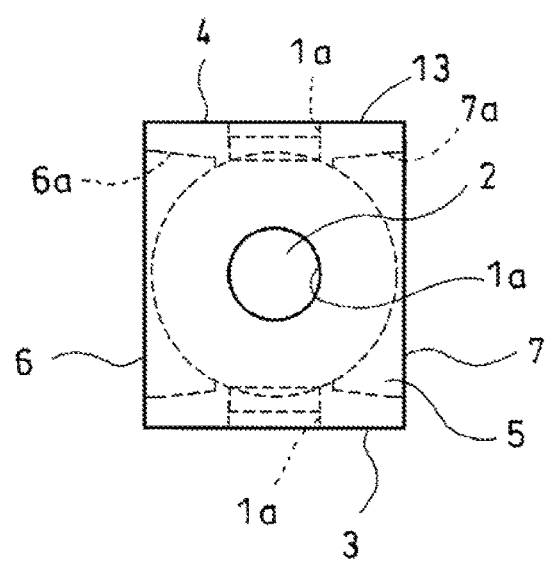
FIG. 2 is a side view of the lens member according to the first embodiment of the present invention.

As illustrated in FIGS. 1 and 2, a lens member 1 includes a ball lens (a glass ball lens) 2 that is made of glass, and a resin mounting portion (a molded body) 13. Sphericity processing has been performed to the ball lens 2. The resin mounting portion (the molded body) 13 has been molded in a state where a portion of the ball lens 2 has entered the inside.

The ball lens 2 is manufactured so as to have predetermined sphericity, for example, by known sphericity processing in a manner similar to a ball for a bearing. This type of glass ball to which the sphericity processing has been performed may be used for the ball lens 2. Alternatively, sphericity processing may be performed to specified lens glass including a glass material so that a ball lens may be produced.

The sphericity, the type of glass material, the diameter, and the like, of the glass ball lens 2 can be arbitrarily selected, and are determined based on usage of the lens member 1, required optical performance, the size and cost of a product including the lens member 1. The available glass material is not particularly limited, and various glass materials can be used. The above ball lens 2 is circular when viewed in an optical axis direction (in a diameter direction through the center of the ball lens 2).

The mounting portion 13 of the lens member 1 basically has a rectangular parallelepiped in shape. Here, the rectangular parallelepiped has a square in section. In other words, the mounting portion 13 is columnar short in an axial direction of the square in section, and substantially includes the ball lens 2 inside. In a case where the mounting portion 13 is viewed as a prismatic member having a square in section, four outer circumferential faces have the same rectangle in shape. The remaining two faces become a front face and a rear face with respect to these four faces. Note that the front face and the rear face may be defined as a face on which light is incident and a face from which the light is emitted, respectively.

In a case where the mounting portion 13 is mounted on a mounting face of a substrate, one of the above four outer circumferential faces is a reference face (an attaching face) 3 to be a bottom face. Two faces disposed perpendicular to the reference face 3 in a left and right direction are left and right side faces 5. The remaining one face parallel to the reference face 3 is a top face 4.

According to the embodiment, the mounting portion 13 has a rectangular parallelepiped having a square in section, and the center of the ball lens 2 is disposed at the center. Thus, when rotated around an axis of a column, the rectangular parallelepiped has a tetragonal, symmetric solid in shape. Therefore, any of the four faces 3, 4, and 5 may be made to be the reference face (the bottom face: the attaching face) and any of the four faces may be made to be the top face or the side face.

A substantially columnar hole 1a is formed on each of the reference face 3, the top face 4, the left and right side faces 5 of the mounting portion 13. The substantially columnar hole 1a has the center corresponding to the center of a rectangular face of each of the faces.

The length of the mounting portion 13 in the axial direction (an axis passing through the center of the front face 6 and the center of the rear face 7) is slightly longer than the diameter of the ball lens 2. When the lens member 1 is viewed from the side of the side face 5, the length in a forward and backward direction (a direction from the front face 6 to the rear face 7) is shorter than the length in an upper and lower direction (a direction from the reference face (the bottom face) 3 to the top face 4). The length in the forward and backward direction is slightly longer than the diameter of the ball lens 2.

Figure 3:
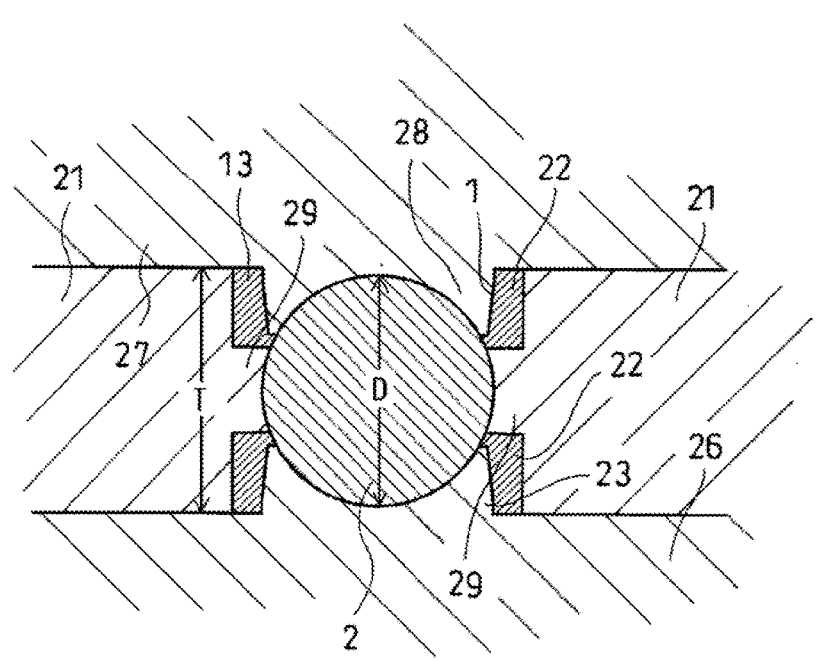
FIG. 3 is a sectional view of a schematic main portion of a die for molding the lens member according to the first embodiment of the present invention.

A line that is parallel to the above axial direction of the mounting portion 13 and passes through the center of the ball lens 2, is the optical axis. The optical axis of the ball lens 2 basically passes through the center of the ball lens 2. In a state where the mounting portion 13 has supported the ball lens 2, the optical axis in the above axial direction of the mounting portion 13 is determined. As illustrated in FIG. 3, the front face 6 and the rear face 7 are disposed perpendicular to the optical axis of the ball lens 2, the front face 6 and the rear face 7 being as a pair of outer faces of the rectangular-parallelepiped-shaped mounting portion 13 that is parallel to each other. Here, in a case where the thickness of the ball lens 2 in the optical axis direction is defined as D. A distance in the optical axis direction (the length of the mounting portion 13 in the optical axis direction) between the pair of faces of the mounting portion 13 (the front face 6 and the rear face 7) that is perpendicular to the optical axis of the ball lens 2, is defined as T. A value of T is a value of D or more. That is, the following expression is satisfied: $1.0D \leq T$.

In this case, as described above, the mounting portion 13 has substantially covered the ball lens 2. Thus, external light barely has an effect on the ball lens 2. Accordingly, stray light can be inhibited. The mounting portion 13 attaches the ball lens 2, for example, on the substrate, supporting the ball lens 2. When the mounting portion 13 is excessively longer than the ball lens 2, an interval with respect to another member on the substrate becomes narrow, causing handling to be difficult. The following expression is preferably satisfied: $T \leq 2.0D$. The rear face 7 (the front face 8) of the mounting portion 13 is preferably on the side close to the ball lens 2 beyond a focus of the ball lens 2, the rear face 7 being a side from which light of the ball lens 2 is emitted.

A state where the ball lens 2 has been completely embedded in the mounting portion 13, is made. That is an outer face of the ball lens 2 is disposed inside the six outer faces of the rectangular-parallelepiped-shaped mounting portion 13. In addition to the above holes 1a, a hole 6a and a hole 7a are provided on the front face 6 and the rear face 7 of the mounting portion 13 of the lens member 1, respectively. The hole 6a and the hole 7a expose a face on which the light of the ball lens 2 is incident and a face from which the light is emitted.

That is, the holes reaching an outer face of the ball lens 2 are provided on at least two outer faces (the front face 6 and the rear face 7) out of the outer faces of the mounting portion 13, the two outer faces being parallel to each other. Thus, at least two portions of the outer face of the ball lens 2 are exposed from the mounting portion 13.

The hole 6a is provided so as to pass from the front face 6 of the mounting portion 13 of the lens member 1 to a surface (an outer face) of the ball lens 2. The hole 7a is provided so as to pass from the rear face 7 of the mounting portion 13 of the lens member 1 to the surface of the ball lens 2. The diameters of the holes 6a and 7a are larger than those of the above holes 1a, but are smaller than the diameter of the ball lens 2. A line segment between the center of the hole 6a and the center of the hole 7a is disposed so as to pass through the center of the ball lens 2.

According to the present embodiment, the front face and the rear face of the mounting portion 13 are the same in shape. Either may be the front face or the rear face. Either of the two spherical surfaces of the ball lens 2 that are exposed from the front face and the rear face, may be an incident face or an emission face.

An AR coating film is deposited on portions of the surface of the ball lens 2 (the spherical surface) that are exposed from the hole 6a and the hole 7a of the mounting portion 13. Note that, the center of the mounting portion 13 and the center of the ball lens 2 do not necessarily correspond to each other and may mutually shift. However, a distance between the reference face 3 and the optical axis of the ball lens 2 is required to be a predetermined distance. Examples of a synthetic resin included in the mounting portion 13, that can be used, include, but are not particularly limited to, a known thermoplastic resin and thermosetting resin. In a case where a reflow process for solder is included in manufacturing a product including the substrate on which the lens member 1 is surface-mounted, the resin of the mounting portion 13 is required to be a resin having thermal resistance that withstands a temperature during the reflow process. The color of the resin may be transparent or other colors, and may be, for example, black.

According to the above lens member 1, the mounting portion 13 can be easily manufactured with a material different from the glass ball lens 2, in a mold in which the ball lens 2 is disposed. The mounting portion 13 has the reference face 3 that abuts on the mounting face (a face to be attached) of the substrate (another member) so that the lens member 1 can be disposed. Thus, for example, the lens member 1 coated with an adhesive can be automatically surface-mounted on a substrate set on an automatic surface mounting device. The lens member 1 can be surface-mounted on the substrate without the ball lens 2 itself rotating and a V-shaped groove provided to the mounting face.

The ball lens 2 is not necessarily required to be polished as a glass lens. A method capable of manufacturing a large number of balls at once, such as sphericity processing similar to that for balls for a bearing, is used. Therefore, a glass ball having high sphericity at a low cost can be used. The cost per ball lens 2 in this case is lower than those in a case where a lens is formed by molding and in a case where each lens is polished. Therefore, even when molding of the mounting portion 13 is required after the ball lens 2 has been manufactured, a cost reduction can be achieved for the lens to be surface-mounted on the substrate.

The lengths of the mounting portion 13 in the forward and backward direction, in a left and right direction, and in the upper and lower direction, are slightly longer than the diameter of the ball lens 2 in order to cause the ball lens 2 to be completely embedded. However, the mounting portion 13 can be further miniaturized than the above body tube or can that includes a ball lens attached thereto.

As the lens member 1 is miniaturized, the length of aside of the sectional square of the above mounting portion 13 comes close to the diameter of the ball lens 2. In this case, a distance between each of the outer circumferential faces 3, 4, and 5 of the mounting portion 13 and the ball lens 2 shortens. Thus, the thickness of the resin included in the mounting portion 13 becomes thin at a portion at which each of the faces 3, 4, and 5 of the mounting portion 13 comes closest to the ball lens 2. As a result, there is a risk that necessary and sufficient strength cannot be retained and a weak state occurs. For example, in the mounting portion 13 in terms of strength, a shortest distance between an outer face of the ball lens 2 disposed in the mounting portion 13 and each of the outer faces of the mounting portion 13 (thinnest thickness), is preferably 0.1 mm or more.

Therefore, for miniaturizing the lens member 1, providing the hole 1a at a portion of each of the faces 3, 4, and 5 adjacent to the ball lens 2, preferably removes the portion to be likely to be weak. For example, a structure in which the hole 1a is provided at a portion at which the thickness of the mounting portion 13, as the above shortest distance, becomes thinner than 0.1 mm, is made. Thus, the thickness can be prevented from being thinner than 0.1 mm.

Accordingly, even when the lens member 1 is miniaturized, the portion of the mounting portion 13 that has been thin can be prevented from being broken. Accordingly, the lens member 1 can be further miniaturized.

In a case where the hole 1a is provided on the reference face 3 that abuts on the mounting face, for example, filling an ultraviolet curable resin as an adhesive into the hole 1a can directly adhere the substrate to the ball lens 2 through the hole 1a due to the ultraviolet curable resin. Thus, adhesive strength can be improved. In this case, filling an adhesive into the hole 1a and increasing the amount of the adhesive, can increase adhesive strength depending on the type of adhesive.

In a case where the adhesive is an ultraviolet curable resin, forming the hole 1a on the top face 4 in addition to the reference face 3, allows ultraviolet rays to be emitted from the hole 1a of the top face 4 to the hole 1a of the reference face 3 through the ball lens 2. Thus, adhesion of the lens member 1 to the substrate is easily performed.

Note that the sectional shape of the mounting portion 13 is not limited to a square.

For example, a distance between the top face 4 and the reference face 3 may be made shorter than a distance between the left and right side faces 5 in order to shorten a distance between the mounting face and the top face 4. Alternatively, the distance between the left and right side faces 5 may be made shorter than the distance between the top face 4 and the reference face 3 in order to narrow the width in the left and right direction. In this case, the hole 1a may be provided on only longer faces out of the respective faces 3, 4, and 5.

Next, a method of manufacturing the lens member 1 according to the present invention will be described. In manufacturing the lens member 1, as the ball lens 2, a glass ball that is a ball made of glass and manufactured by known sphericity processing, is used. A resin mounting portion 13 is manufactured outside the glass ball by resin molding. Examples of the resin molding that are used include injection molding. In the injection molding, a die schematically illustrated in FIGS. 3 to 6 is used.

The die is included in a cavity 22 as a space in which a resin is filled and molded. The die includes a pair of dies (a fixed die 26 and a movable die 27) and a slide core 21 disposed therebetween. Note that the slide core 21 is provided so as to reciprocate in one direction with respect to the fixed die 26. The slide core 21 may be provided so as to reciprocate with respect to the movable die 27.

The cavity 22 is coupled to a runner 24 that fills the resin into the cavity 22, through a gate. For example, the runner 24 is provided to the slide core 21, and is coupled to one corner portion out of outer circumferential four corner portions of the cavity 22. A runner portion 24a molded by the runner 24 after molding, is cut off together with a portion molded at the gate, at a corner portion of the mounting portion 13 corresponding to the cavity 22. For example, according to the present embodiment, the resin molded by the gate is cut off at a position of a section 25 illustrated in FIG. 1. In this case, a gate mark (a cutoff mark) is made so as not to protrude from the outer circumferential face including the above four faces 3, 4, and 5 of the mounting portion 13, to the outside.

The fixed die 26 includes a ball-receiving portion 23 having a spherical surface corresponding to the ball lens 2, provided thereto. The ball lens 2 is disposed on the spherical surface of the ball-receiving portion 23. The ball lens 2 and the ball-receiving portion 23 are in surface-contact with each other through the spherical surface. The resin filled into the cavity 22 is prevented from entering between the ball-receiving portion 23 and the ball lens 2. The ball-receiving portion 23 is formed so as to protrude from a portion included in a bottom face of the cavity 22 of the fixed die 26. The ball-receiving portion 23 molds the hole 6a (the hole 7a) on the front face (or the rear face) of the mounting portion 13 of the lens member 1.

Four slide cores 21 are provided in accordance with the above four faces 3, 4, and 5 of the mounting portion 13, and each can be made to reciprocate in different four directions perpendicular to each other. Leading ends of the slide cores 21 have a leading end face 32 included in each of four wall faces surrounding the cavity 22. The leading end faces 32 each include a columnar protruding portion 29 for forming the hole 1a on each of the outer circumferential faces 3, 4, and 5 of the mounting portion 13, provided thereto. When the lens member 1 including the mounting portion 13 molded is released and taken out after resin molding, with respect to a closing position at which the four slide cores 21 move the respective leading end faces 32 close to, forward, and maximally so as to form the four outer faces of the cavity 22 with the leading end faces 32, the four slide cores 21 move backward until the columnar protruding portions 29 have completely come off the holes 1a of the mounting portion 13 that have been molded.

The movable die 27 has the same shape that has plane symmetry with respect to the fixed die 26 except the slide cores 21, and includes a ball-covering portion 28 having a shape that is an upside-down ball-receiving portion 23. The ball-covering portion 28 includes a spherical surface corresponding to the ball lens 2 like the ball-receiving portion 23. The spherical surface is in surface-contact with the spherical surface of the ball lens 2 in a state where the movable die 27 has closed. Thus, the resin filled into the cavity 22 is prevented from entering between the ball-covering portion 28 and the ball lens 2. The ball-covering portion 28 is formed so as to protrude from a portion included in the bottom face of the cavity 22 of the fixed die 26. The ball-covering portion 28 molds the hole 6a (the hole 7a) of the front face (or the rear face) of the mounting portion 13 of the lens member 1.

Figure 4:
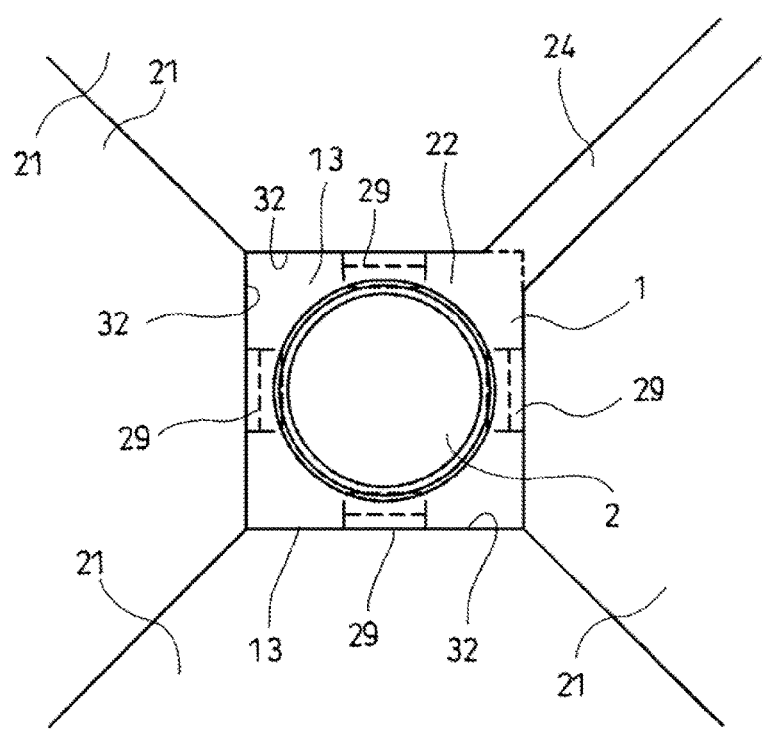
FIG. 4 is a plan view of a schematic main portion of the die in a state where a movable die has been removed according to the first embodiment of the present invention.
Figure 5:
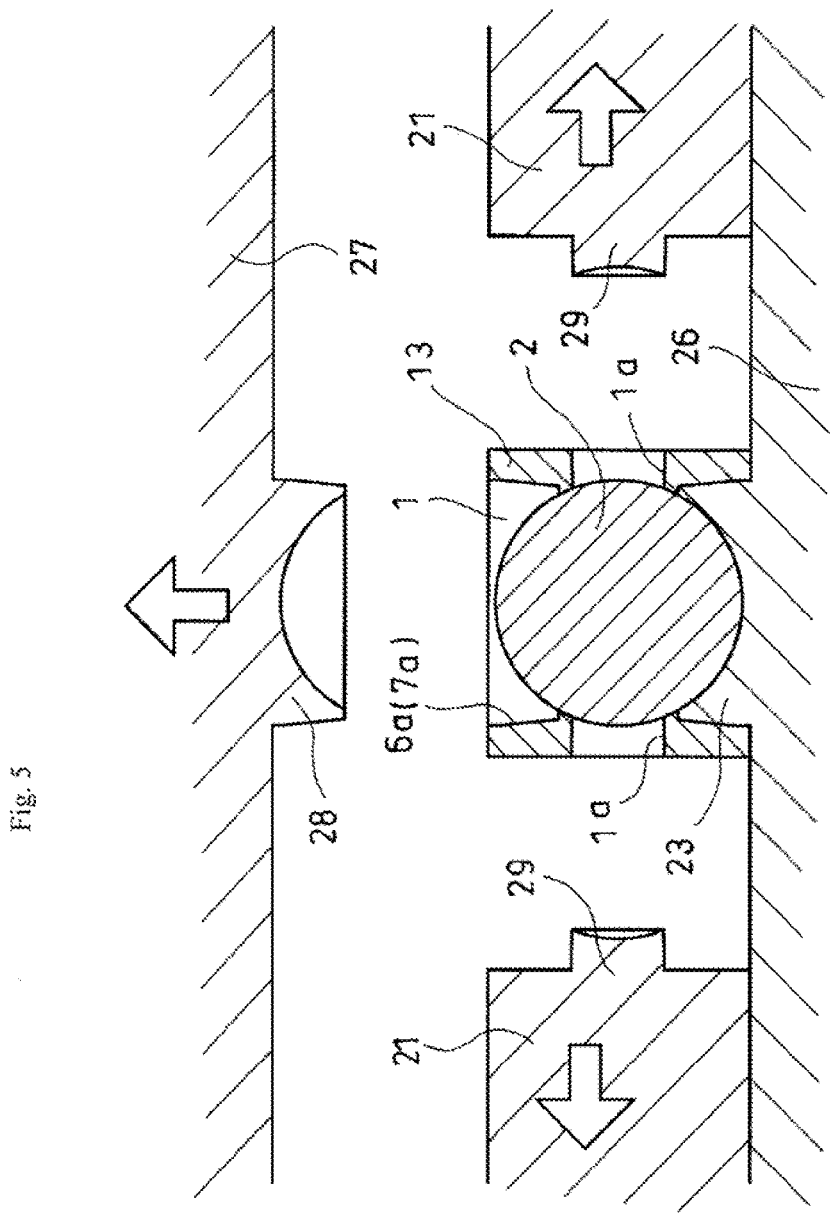
FIG. 5 is a sectional view of a schematic main portion of the die in a state where the die has opened according to the first embodiment of the present invention.
Figure 6:
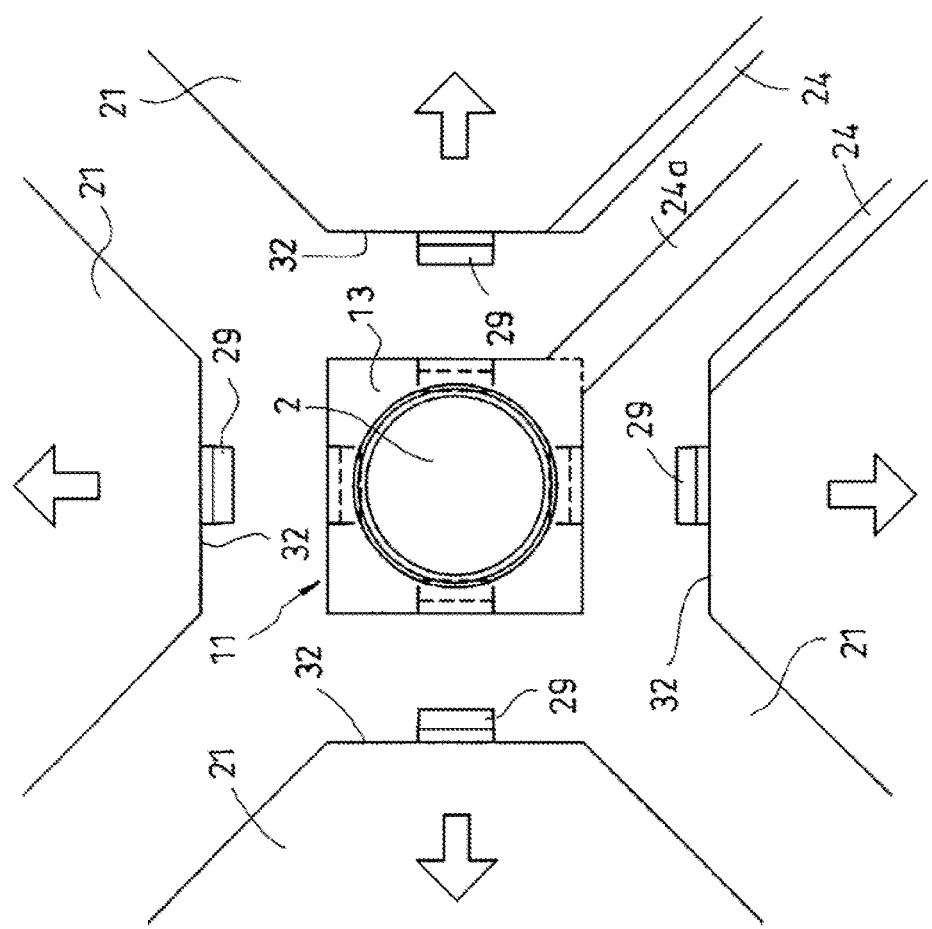
FIG. 6 is a plan view of a schematic main portion of the die in a state where the movable die has been removed and the die has opened according to the first embodiment of the present invention.

In molding with the above die, as illustrated in FIGS. 5 and 6, first, the respective slide cores 21 move backward along arrows, and also the movable die 27 rises along an arrow. Then, the ball lens 2 is disposed on the spherical surface of the ball-receiving portion 23. Next, the slide cores 21 move forward so that, as illustrated in FIGS. 3 and 4, a state where the four leading end faces 32 of the slide cores 21 surround the circumference of the cavity 22 is made. In addition, a leading end face of each of the columnar protruding portions 29 of the slide cores 21 abut on the ball lens 2 held by the ball-receiving portion 23.

In this case, the movable die 27 descends and comes close to the fixed die 26. In this case, a state where the movable die 27 has closed the upper side of the cavity 22 and also the ball-covering portion 28 has covered the ball lens 2, is made. Accordingly, the spherical surface of the ball-receiving portion 23 and the spherical surface of the ball-covering portion 28 cover faces of the ball lens 2 on which light is incident or from which the light is emitted. Thus, the faces are prevented from coming in contact with the resin that is flowable. Similarly, the resin having fluidity is prevented from entering contact surfaces between the columnar protruding portions 29 of the slide cores 21 and the ball lens 2.

The resin is filled into the cavity 22 through the gate from the runner 24 in a state where the fixed die 26, the movable die 27, and the four slide cores 21 have closed.

Accordingly, the rectangular-parallelepiped-shaped mounting portion 13 is molded around the ball lens 2.

Next, the movable die 27 ascends and also the slide cores 21 move backward reversely with respect to the above case so that the lens member 1 including the mounting portion 13 that has been molded is taken out.

According to the above method of manufacturing the lens member 1, the ball lens 2 that is relatively inexpensive and is manufactured by sphericity processing is used as a glass lens. The mounting portion 13 having the reference face 3 is molded around the ball lens 2 by resin molding. Thus, the lens member 1 can be manufactured relatively and inexpensively. That is, the cost can be reduced in comparison to a square lens that is a conventional glass molded lens, or a lens member including a ball lens sealed in a housing or a can. The mounting portion 13 can be miniaturized so as to have a size close to the diameter of the ball lens 2. For example, the miniaturization of the mounting portion 13 can meet a requirement for miniaturizing a device for optical communication. For example, the lengths of the respective sides of the sectional square of the mounting portion 13 can be set to be, for example, 1 mm, 2 mm, or 3 mm. Note that, in this case, the diameter of the ball lens 2 is set corresponding to the size of the mounting portion 13. Note that, the size of the mounting portion 13 is not limited to the above examples, and may be 1 mm or less, or 3 mm or more.

Next, a lens member 101 according to a second embodiment will be described.

Note that according to the following respective embodiments, lens members 101, 41, 51, 62, 71, and 81 include a ball lens 2 (or, for example, an aspheric lens 72 to be described later) and resin mounting portions 113, 49, 59, 69, 79, and 89, respectively, similarly to the lens member 1 according to the first embodiment. The ball lens 2 is similar to that according to the first embodiment. The shapes of the mounting portions 113, 49, 59, 69, 79, and 89 are different from that according to the first embodiment. In the following descriptions, portions different from those according to the first embodiment will be described. Descriptions for configurations similar to those according to the first embodiment will be omitted or simplified.

As illustrated in FIGS. 7A to 7D, the mounting portion 113 of the lens member 101 basically has a rectangular parallelepiped in shape, similarly to that according to the first embodiment. Here, the mounting portion 113 has a quadratic prism, in shape, short in an axial direction of a sectional square.

In a case where the mounting portion 113 is mounted on a mounting face 108 (a face to be attached, illustrated in FIG. 9) of a substrate 109 (illustrated in FIG. 9), one of the above outer circumferential four faces is a reference face 103 to be a bottom face. Faces disposed perpendicular to the reference face 103 in a left and right direction, are left and right side faces 105. The remaining face parallel to the reference face 103 is a top face 104.

Note that FIG. 7A is a bottom view, FIG. 7B is a plan view, FIG. 7C is a side view, and FIG. 7D is a front view (or a rear view).

According to the embodiment, the mounting portion 113 includes the ball lens 2 disposed therein so that the center of the mounting portion 113 corresponds to the center of the ball lens 2. Thus, when rotated around the axis of the quadratic prism having the sectional square, the mounting portion 113 has tetragonal, symmetric solid in shape. Therefore, any of the four faces 103, 1044, and 105 may be the reference face (the bottom face), or any may be the top face or the side faces.

A substantially columnar hole 101a is formed on each of the reference face 103, the top face 104, and the left and right side faces 105 of the mounting portion 113, similarly to the first embodiment. The substantially columnar hole 101a has the center corresponding to the center of a rectangular face of each of the faces. Note that, as illustrated in FIG. 8, the hole 101a is not necessarily provided to the reference face 103, the top face 104, and the left and right side faces 105. The hole 101a may be provided to only the reference face 103, only to the reference face 103 and the top face 104, or only to the left and right side faces 105. The hole 101a is preferably provided to at least the reference face 103 or the reference face 103 and the top face 104.

The length of the mounting portion 113 in the axial direction is shorter than the diameter of the ball lens 2. For example, the length of the mounting portion 113 is approximately the radius of the ball lens 2 or is shorter than the radius. Therefore, in a case where the center of the ball lens 2 is disposed at the center of the mounting portion 113, a state where the ball lens 2 is exposed from the front face 106 and the rear face 107 of the mounting portion 113, is made. Portions of a spherical surface of the ball lens 2 that protrude and are exposed from the mounting portion 113 become an incident face or an emission face.

Therefore, an outer face of the ball lens 2 is disposed inside at least two, parallel to each other, out of the six outer faces of the mounting portion 113 (the front face 106, the rear face 107, the reference face 103, the top face 104, and the left and right side faces 105). Here, the outer face of the ball lens 2 is disposed inside four outer faces. Portions of the outer face of the ball lens 2 protrude and are disposed outside with respect to the front face 106 and the rear face 107 that are the remaining outer faces. Note that the length of the mounting portion 113 in an optical axis direction of the ball lens 2, namely, a distance between the front face 106 and the rear face 107 is shorter than the length of the ball lens 2 in the optical axis direction, namely, the diameter. Here, in a case where the thickness of the ball lens 2 in the optical axis direction is defined as D and the distance between the front face 106 and the rear face 107 of the mounting portion 113 that are a pair of outer faces perpendicular to the optical axis of the ball lens 2, in the optical axis direction is defined as T, the following expression is preferably satisfied: $0.2D \leq T$. That is, in a case where the distance T is excessively short with respect to the diameter D of the ball lens 2, the lens member 101 becomes unstable when the lens member 101 is mounted. As a result, a possibility that the lens member 101 falls down, increases. Therefore, the length of the mounting portion 113 in the optical axis direction is preferably longer than 0.2 times the diameter of the ball lens 2.

According to the present embodiment, the front face 106 and the rear face 107 of the mounting portion 113 has the same shape. Thus, either may be the front face 106 or the rear face 107. Either of two portions of the spherical surface of the ball lens 2 that are exposed from the front face 106 and the rear face 107, may be the incident face or the emission face. AR coating films are deposited on the portions of the surface (the spherical surface) of the ball lens 2 that are exposed from the mounting portion 113.

Figure 9:
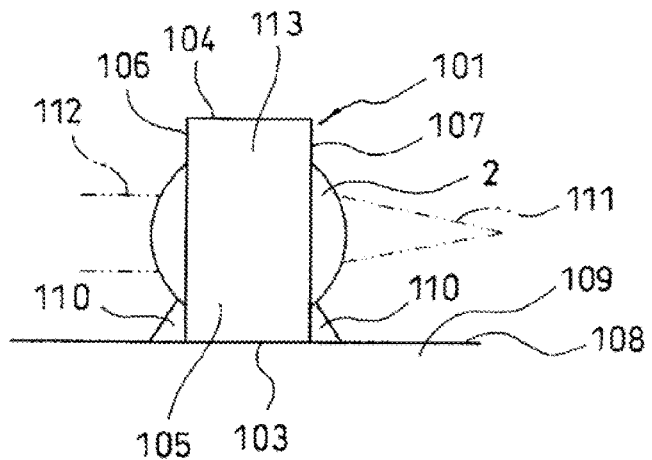
FIG. 9 is a side view of the lens member mounted on a substrate according to the second embodiment of the present invention.

As illustrated in FIG. 9, for example, the above lens member 101 adheres to and fixes to the mounting face 108 after disposed on the mounting face 108 of the substrate 109. In this case, for example, an automatic surface mounting device is used and the lens member 101 is disposed and fixed in a determined direction at a determined position on the mounting face 108 of the substrate 109 (a predetermined coordinates position in a system of XY coordinates). In this case, the reference face 103 has abutted on the mounting face 108. Thus, the lens member 101 is disposed on the substrate 109 in a stable state. In addition, the mounting portion 113 is adhered, for example, with an ultraviolet curable resin 110 as an adhesive. A numeral reference 111 and a numeral reference 112 represent incident light or emission light of the ball lens 2, respectively.

Next, the lens member 41 according to a third embodiment will be described.

Figure 10:
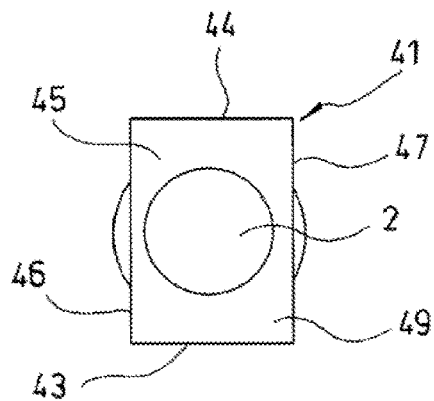
FIG. 10 is a side view of a lens member according to a third embodiment of the present invention.

As illustrated in FIG. 10, the lens member 41 corresponds to light beams in two directions. A front face 46 and a rear face 47 of the mounting portion 49 are the same in shape. In addition, left and right side faces 45 of the mounting portion 49 have the same shape as the front face 46 and the rear face 47. That is a ball lens 2 protrudes and is exposed from the left and right side faces 45 similarly to the front face 46 and the rear face 47.

Therefore, in the lens member 41, portions of a spherical surface of the ball lens 2 that are exposed from the front face 46 and the rear face 47 can be an incident face or an emission face of light beam. In addition, portions of the spherical surface of the ball lens 2 that are exposed from the left and right side faces can be an incident face or an emission face of light beam.

That is the lens member 41 can function as a lens with respect to two light beams substantially perpendicular to each other. For example, light beams in two directions can be converted to converging light or parallel light at once. A cost reduction can be achieved for a substrate including a plurality of optical passages that requires the ball lens 2, set thereto. Note that the mounting portion 49 of the lens member 41 includes a reference face 43, a top face 44, side faces 45, the front face 46, and the rear face 47 as in the first embodiment.

Next, the lens member 51 according to a fourth embodiment will be described.

Figure 11:
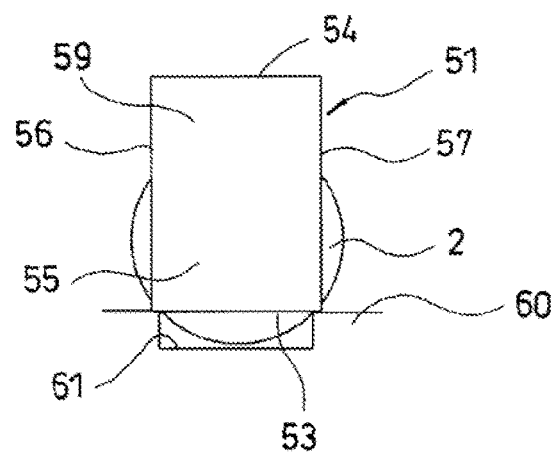
FIG. 11 is a side view of a lens member according to a fourth embodiment of the present invention.

As illustrated in FIG. 11, a ball lens 2 in the lens member 51 is disposed so as to have eccentricity on the lower side with respect to the mounting portion 59. According to the first, second, and third embodiments, the centers of the mounting portions 13, 112, and 49 of the lens member 1, 101, and 41, to be mounted on the substrate 109, substantially correspond to the center of the ball lens 2. According to the fourth embodiment, the center of the ball lens 2 is lowered downward. Thus, as a bottom face, a portion of a surface of the ball lens 2 has protruded from a reference face 53.

Therefore, it is difficult to dispose the lens member 51 on a substrate 60 with the lens member 51 remaining. Thus, a recess portion 61 is provided on a surface (a face to be attached) of the substrate 60. The reference face 53 of the lens member 51 abuts on the surface of the substrate 60 in a state where the recess portion 61 has housed the portion of the ball lens 2 protruding from the reference face 53 of the lens member 51. Note that a through hole may be used instead of the recess portion 61.

Basically in the lens member 1, a distance of the optical axis from the mounting face cannot be the radius of the ball lens 2 or less in a case where the optical axis of the ball lens 2 is made to be parallel to a mounting face of a substrate. Therefore, as described above, the recess portion 61 is provided on the surface (the mounting face) of the substrate 60. Then, the lens member 51 is mounted in a state where the portion of the ball lens 2 protruding downward has been housed. Thus, a position of an optical axis can be disposed at a position at which a distance between the optical axis and the surface of the substrate 60 is the radius of the ball lens 2 or less. Note that the mounting portion 59 of the lens member 51 includes the reference face 53, a top face 54, side faces 55, a front face 56, and a rear face 57, similarly to the first embodiment.

Next, the lens member 62 according to a fifth embodiment will be described.

Figure 12:
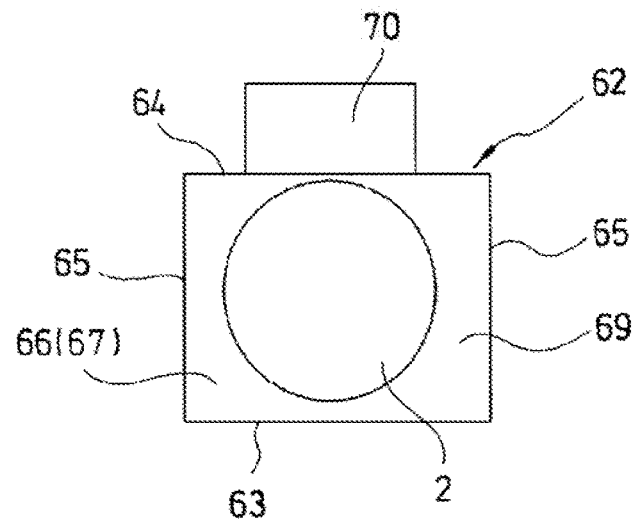
FIG. 12 is a side view of a lens member according to a fifth embodiment of the present invention.

As illustrated in FIG. 12, the lens member 62 includes a protruding portion 70 protruding upward, provided on a top face 64 of the mounting portion 69 of the lens member 62 substantially the same as the lens member 101 according to the second embodiment. The protruding portion 70 is a portion to be grasped when the lens member 62 is transferred to a mounting face by an automatic surface mounting device, for example. Grasping the protruding portion 70 can prevent a grasping device from coming in contact with a ball lens 2 protruding from the mounting portion 69. Note that, the mounting portion 69 of the lens member 62 includes a reference face 63, a top face 64, side faces 65, a front face 66, and a rear face 67, as in the first embodiment.

Next, the lens member 71 according to a sixth embodiment will be described.

Figure 13:
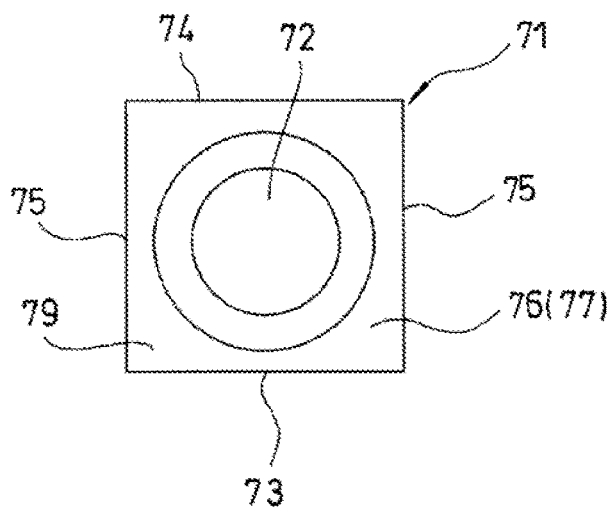
FIG. 13 is a front view (a rear view) of a lens member according to a sixth embodiment of the present invention.
Figure 14:
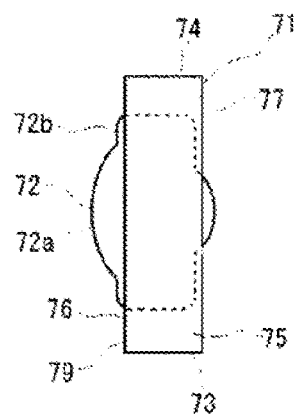
FIG. 14 is a side view of the lens member according to the sixth embodiment of the present invention.

As illustrated in FIGS. 13 and 14, the lens member 71 includes the aspheric lens 72 previously manufactured, instead of the ball lens 2. The mounting portion 79 is molded with a resin in a state where the aspheric lens 72 has been set in a die. In this case, the cost of the lens member 71 depends on the aspheric lens 72. A reference face for surface-mounting can be provided to the aspheric lens 72 at a low cost.

Note that the lens member 71 includes a reference face 73, a top face 74, side faces 75, a front face 76, and a rear face 77 as in the first embodiment.

The aspheric lens 72 is circular when viewed in the optical axis direction. In a case where the mounting portion 13 is manufactured by press molding, the molding is performed in a cavity of the die by pressurizing the aspheric lens disposed in the cavity. Thus, when the aspheric lens has rotational symmetric and an outer form is circular, molding accuracy can be improved. Note that the outer diameter of the aspheric lens may be elliptical. However, it is thought that providing a circle is higher than providing the ellipse in molding accuracy.

The aspheric lens 72 includes an optical functioning portion 72a having an optical function, and a flange portion 72b that is provided around the optical functioning portion 72a and is used, for example, for attaching the lens. A front face and a rear face of the optical functioning portion 72a of the aspheric lens 72 are exposed from holes provided on a front face 76 and a rear face 77 of the mounting portion 79. According to the present embodiment, in the mounting portion 79, a front face of the flange portion 72b is exposed on the side of an incident surface (the front face 76), and the mounting portion 13 is molded so as to cover the flange portion 72b on the side of emission (the rear face 77). When the optical functioning portion 72a is exposed, the flange portion 72b is not necessarily exposed.

Figure 15:
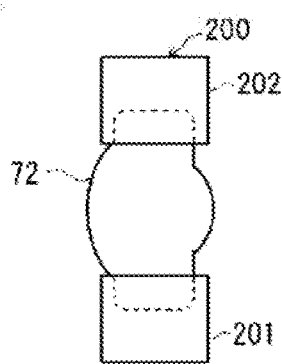
FIG. 15 is a side view in a modification in which amounting portion is divided into two according to the sixth embodiment of the present invention.
Figure 16:
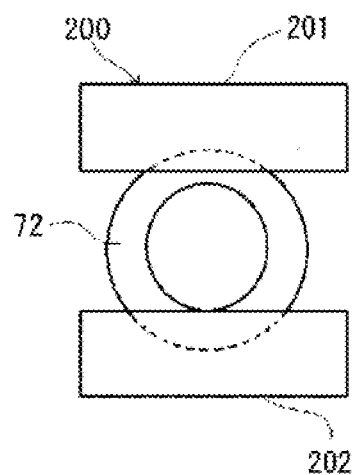
FIG. 16 is a front view in the modification in which the mounting portion is divided into two according to the sixth embodiment of the present invention.

Next, a lens member according to a modification of the six embodiment, will be described. As illustrated in FIGS. 15 and 16, according to the modification, a divided mounting portion 200 including a lower portion 202 and an upper portion 201, is used instead of the integrated mounting portion 79. A lens supported by the mounting portion 200 is the above aspheric lens 72. A bottom face of the lower portion 202 of the mounting portion 200 is a reference face. An emission face and an incident face of the aspheric lens 72 are exposed between the upper portion 201 and the lower portion 202 of the mounting portion 200.

Next, the lens member 81 according to a seventh embodiment will be described.

Figure 17:
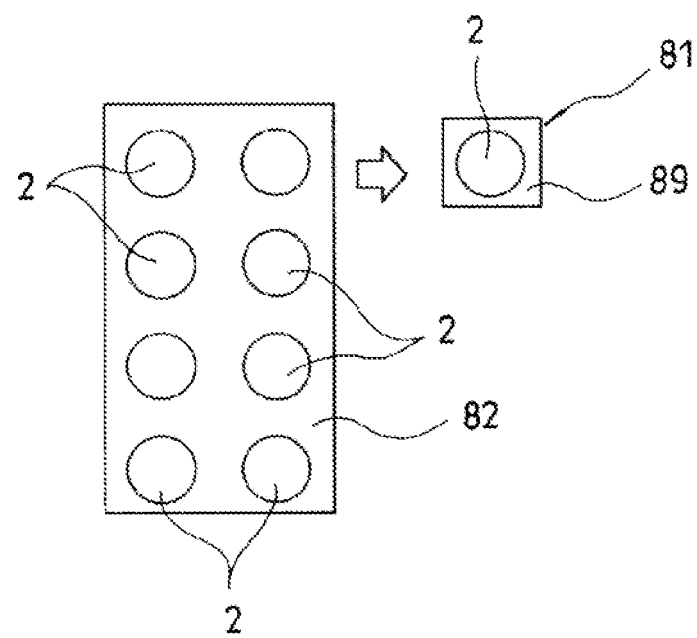
FIG. 17 is a view for describing a lens member according to a seventh embodiment of the present invention.

As illustrated in FIG. 17, the lens member 81 is manufactured so that a plurality of lens members 81 can be acquired. For example, one plate-like molded portion 82 including portions to be a plurality of mounting portions 89, is molded. In molding, a plurality of ball lenses 2 is vertically and horizontally arranged in a matrix in a die. According to the present embodiment, the molded portion 82 that has been molded includes the ball lenses 2 arranged in two columns and in four rows. The numbers of rows and columns can be arbitrarily set.

In a state where the molding has been completed, each of the ball lenses 2 is cut off in accordance with the columns and the rows so as to be separated. Thus, the individual lens member 81 is used. The shape of the mounting portion 89 is a shape in a case where there is no hole 1a on each of the faces, 103, 104, and 105 of the mounting portion 113 according to the second embodiment. In manufacturing the mounting portion 89, cutting processing is required after the molding. A large number of lens members 81 can be molded by the molding at once. Thus, a cost reduction can be achieved.

According to the above respective embodiments, the mounting portions 13, 113, 49, 59, 69, 79, and 89 (82) are manufactured by synthetic resin molding, and may be manufactured with glass (ceramics) by a sol-gel method. In this case, a glass material having fluidity before solation or after the solation is filled in a mold for forming the mounting portions 13, 49, 59, 69, 79, and 89 (82). Then, the solation with gelation, or the gelation is performed. After that the mounting portions 13, 49, 59, 69, 79, and 89 (82) is manufactured by heating and drying.

Each of the lens members according to the respective embodiments can be effectively used for a projector, a head-up display, or the like in addition to being used for the above device for optical communication. Each of the lens members can be used for data transmission in an electronic circuit board. For example, the following structure may be provided. A laser diode as a light source irradiates a laser beam to the side of output of each of the lens members that has been surface-mounted. Then, the laser beam is converted to a parallel beam. The parallel laser beam is incident on the side of input of each of the lens member so as to be focused. After that a light receiving element is irradiated with the focused laser beam. A structure in which the data transmission can be performed with the above laser beam in the electronic circuit board, can be made. That is, each of the lens members has been miniaturized so that optical communication within the electronic circuit board can be performed without an optical fiber.

Next, a communication module according to an eighth embodiment of the present will be described.

The communication module according to the present embodiment uses any of the lens members 1, 41, 51, 62, 71, 81, 101 according to the above respective embodiments. Here, the lens member 101 according to the second embodiment is used.

As illustrated in FIG. 18, the optical communication module includes a light-emitting element 331, the lens member 101, and a housing 332 covering thereof provided on a substrate 330. In the housing 332, a fiber fixing portion 333 protruding from one end face of the housing 332 is formed. In addition, the fiber fixing portion 333 fixes one end portion of an optical fiber (an optical communication cable).

The light-emitting element 331 includes, for example, a semiconductor laser, and has a light-emitting point 331a on an upper end portion. A laser beam is oscillated from the light-emitting point 331a. The lens member 101 is disposed so that the center position of the ball lens 2 is the same as the light-emitting point 331a of the light-emitting element 331 in height. The laser beam oscillated from the light-emitting point 331a of the light-emitting element 331 is a diverging ray. The diverging ray is incident on the ball lens 2 of the lens member 101 and then emitted as a converging ray. The ray that has been emitted is coupled to an end face of the optical fiber 334.

For the above communication module, using the above lens members 1, 41, 51, 62, 71, 81, and 101 facilitates miniaturization.

Next, a lens array according to a ninth embodiment of the present invention will be described.

As illustrated in FIGS. 19A and 19B, the lens array 401 according to the present embodiment includes ball lenses 2 supported in a row on one molded body (a mounting portion) 402. That is, the molded body 402 of the lens array 401 is molded so as to support the plurality of ball lens 2 in a row. The shape of the lens array 401 basically has a shape similar to a shape in which the lens members 1, 41, 51, 62, 71, 81, and 101 according to the above respective embodiments are arranged and integrally formed in a row. According to the present embodiment, the shape is substantially the same as a shape in a case where three lens members 101 are coupled in a state where the hole 101a is eliminated from the lens member 101 according to the second embodiment. That is the length of the molded body 402 in an optical axis direction of the ball lenses 2 is shorter than the diameters of the ball lenses 2. The ball lenses 2 are exposed from a front face 406 and a rear face 407 of the molded body 402. One of the two exposed portions of the ball lenses 2 is an incident face and the other is an emission face.

The molded body 402 of the lens array 401 includes the front face 406, the rear face 407, left and right side faces 405, a reference face (a bottom face) 403, and a top face 404.

This type of lens array 401 is used in the above communication module, for example, in a case where a laser is simultaneously incident on a plurality of optical communication cables. For example, the lens array 401 according to the present embodiment can be simultaneously coupled to three optical communication cables.

The lens array 401 basically has the shape similar to the shape in which the lens members 1, 41, 51, 62, 71, 81, and 101 according to the present invention, such as the lens member 101, are coupled in a row. The lens array 401 can acquire a functional effect similar to those of the respective lens members 1, 41, 51, 62, 71, 81, and 101.

Next, a modification according to the ninth embodiment of the present invention will be described. As illustrated in FIG. 20, a lens array 501 according to the modification includes, for example, n ball lenses 2 (n is an integer of two or more) in a row supported by a molded body 502. The molded body 502 includes a transparent resin. For example, only a portion of each of the ball lenses 2 to be an incident face is exposed from the molded body 502. Each of the ball lenses 2 is not exposed from the molded body 502 on the side of an emission face, and is inside the molded body 502. Note that a state where each of the ball lenses 2 may be exposed on the side of the emission face, and may be covered with the molded body 50 on the side of the incident face.

An outer face of the molded body 502 on the side on which each of the ball lenses 2 is exposed is a front face 506. An outer face parallel to the front face 506, on the side on which each of the ball lenses 2 is not exposed, is a rear face 507. A top face and a reference face 504 include a pair of outer faces long in a direction in which the ball lenses 2 are in a row, out of outer faces perpendicular to these front face 506 and rear face 507. In the figure, a face on the near side of the molded body 502 is the reference face 504. Side faces 405 include a pair of remaining narrow outer faces.

Figure 21:
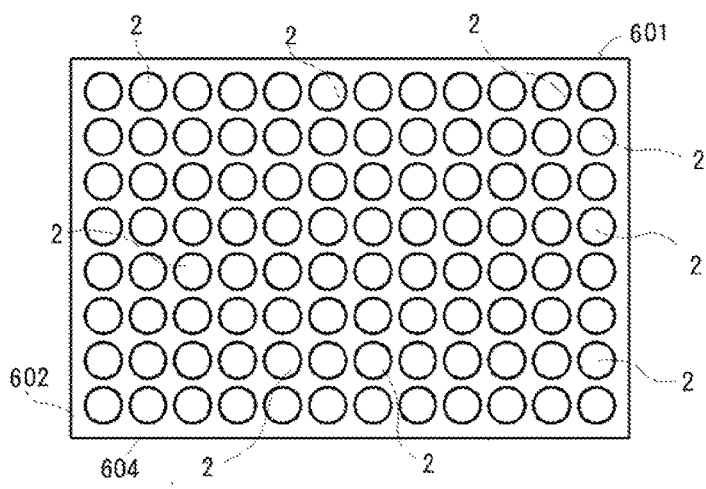
FIG. 21 is a schematic view of a lens array in another modification according to the ninth embodiment of the present invention.

Another modification according to the eighth embodiment will be described. A lens array 601 illustrated in FIG. 21 includes ball lenses 2 arranged in rows and columns in an arrangement of n×m (n and m are an integer of two or more), and supported by a molded body 602. The lens array 601 includes the molded body 602 formed of a transparent resin like the lens array 501. Only one portion of each of the ball lenses 2 is exposed, for example, only an incident face is exposed. Note that only an emission face may be exposed.

A reference face of the lens array 601 may be any of four outer faces perpendicular to an outer face from which the ball lenses 2 are exposed. Any of the above four outer faces can be used for the reference face. The reference face can be selected in response to a configuration for use or a condition. According to the modification, an outer face facing downward in the figure is a reference face 604. The lens array 601 includes the ball lenses 2 disposed in a plurality of rows, whereas the lens array 501 includes the ball lenses 2 are disposed only in a row. However, the lens array 601 has a basic configuration substantially the same as that of the lens array 501.

Note that, the lens array 601 can be used, for example, as a lens array for a light-source module to be described later. In a case where the lens array 601 is used for the light-source module, a face parallel to a face from which the ball lenses 2 are exposed, may be, for example, a reference face with respect to a light-source portion including a light-emitting element to be described later. That is, when the lens array 601 and the light-source portion including a plurality of light-emitting elements mounted thereon (for example, a substrate for light-emitting elements) are disposed so as to overlap with each other, positioning between the lens array 601 and the light-source portion may be made at the reference face (alignment).

Next, a light-source module according to a tenth embodiment of the present invention will be described.

Figure 22:
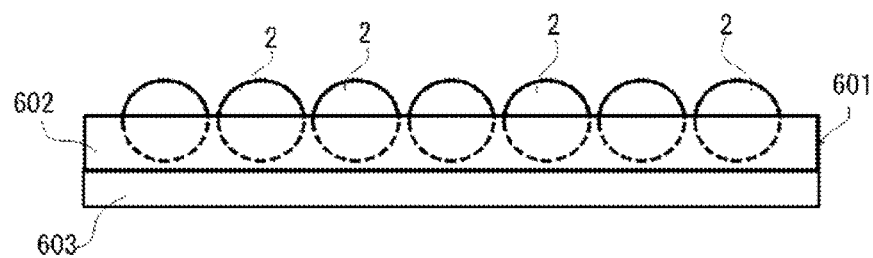
FIG. 22 is aside view of a light-source module according to a tenth embodiment of the present invention.

As illustrated in FIG. 22, the light-source module includes the above lens array 601 having the ball lenses 2 arranged in rows and columns, and a light-source portion 603 having a plurality of optical elements, such light-emitting diodes or semiconductor lasers, arranged in rows and columns similarly.

The light-source module is used for backlight or other lighting, or is used for a display in combination with a liquid crystal display or the like.

In the above respective embodiments, the reference faces (the attaching faces) 3, 43, 53, 63, 73, 103, 403, 504, and 604 may be provided to the mounting portions 13, 49, 59, 69, 79, 89, and 113 or the molded bodies 402, 502, and 602 so as to be shaved. That is the reference faces 3, 43, 53, 63, 73, 103, 403, 504, and 604 may be provided by cutting processing after the mounting portions 13, 49, 59, 69, 79, 89, and 113 and the molded bodies 402, 502, and 602 have been molded. The reference faces 3, 43, 53, 63, 73, 103, 403, 504, and 604 may include a recess portion or a protruding portion as a reference for positioning when attached to another member, such as a substrate. As described above, the reference faces 3, 43, 53, 63, 73, 103, 403, 504, and 604 regulate a distance between another member and an optical axis of a lens, such as the ball lens 2, when attached to another member, such as a substrate.

REFERENCE SINGS LIST

1 Lens member
1*a* Hole
2 Glass ball lens (glass lens: ball lens: glass ball)
3 Reference face (bottom face: attaching face)
13 Mounting portion (molded body)
41 Lens member
43 Reference face (bottom face: attaching face)
49 Mounting portion (molded body)
51 Lens member
53 Reference face (bottom face: attaching face)
59 Mounting portion (molded body)
62 Lens member
63 Reference face (bottom face: attaching face)
69 Mounting portion (molded body)
71 Lens member
73 Reference face (bottom face: attaching face)
79 Mounting portion (molded body)
81 Lens member
89 Mounting portion (molded body)
101 Lens member
103 Reference face (bottom face: attaching face)
108 Mounting face (face to be attached)
113 Mounting portion (molded body)
330 Substrate
331 Optical element
401 Lens array
402 Molded body (mounting portion)
403 Reference face (attaching face)
501 Lens array
502 Molded body (mounting portion)
504 Reference face (mounting face)
601 Lens array
602 Molded body (mounting portion)
603 Light-source portion (optical element)

The invention claimed is:

1. A lens member to be surface-mounted to a substrate, the lens member comprising:
   a glass lens that has been previously made; and
   a mounting portion which, with the glass lens disposed inside, is in a state where a resin material different from the glass lens has been formed into a polygonal column surrounded by a plurality of planes,
   wherein:
      when the mounting portion having the glass lens is surface-mounted onto the substrate, one of the planes of the mounting portion is used as an attachment face located on a mounting face of the substrate, and
   a pair of mutually parallel planes are disposed on the mounting portion in a direction orthogonal to an optical axis of the glass lens, and when a thickness of the glass lens in the optical axis direction is D and a distance between the pair of planes in the optical axis direction orthogonal to the optical axis of the glass lens of the mounting portion is T, D and T satisfy the following condition:

$$0.2D \leq T \leq 2.0D.$$

2. The lens member according to claim 1, wherein the glass lens is circular when viewed in an optical axis direction.

3. The lens member according to claim 1, wherein the glass lens is a glass ball lens including a glass ball to which sphericity processing has been performed.

4. The lens member according to claim 3, wherein a hole extends from at least one of the planes to an outer surface of the glass ball lens in a portion of the mounting portion where the at least one of the planes and the outer surface of the glass ball lens are closest to each other.

5. The lens member according to claim 3, wherein a hole extends from the attachment face to an outer surface of the glass ball lens in a portion of the mounting portion where the attachment face and the outer surface of the glass ball lens are closest to each other.

6. The lens member according to claim 1, wherein a hole extends from at least one of the planes to an outer surface of the glass lens in a portion of the mounting portion where the at least one of the planes and the outer surface of the glass lens are closest to each other.

7. The lens member according to claim 1, wherein a hole extends from the attachment face to an outer surface of the glass lens in a portion of the mounting portion where the attachment face and the outer surface of the glass lens are closest to each other.

8. The lens member according to claim 1, wherein a shortest distance between an outer surface of the glass lens disposed within the mounting portion and side face of the mounting portion is 0.1 mm or more.

9. The lens member according to claim 1, wherein the glass lens is arranged such that the incident surface thereof receiving a light coming to the glass lens and the emission surface thereof allowing an emission of light from the glass lens are respectively exposed from the planes of the mounting portion.

10. A lens member manufacturing method for manufacturing a lens member according to claim 1, the lens member manufacturing method comprising:
providing a mounting portion including an attachment face that abuts the mounting face when a glass lens is surface-mounted, by flowing a material, different from the glass lens and having a fluidity, into a mold in which the glass lens previously made is disposed and by fixing the material.

11. A communication module comprising:
a lens member according to claim 1;
a light-emitting element; and
a substrate surface-mounting the lens member and the light-emitting element,
wherein a light from the light-emitting element is caused to incident on an optical communication cable through the lens member.

* * * * *